(12) United States Patent
Omar et al.

(10) Patent No.: US 11,989,893 B2
(45) Date of Patent: May 21, 2024

(54) METHODS AND SYSTEMS FOR CAMERA TO LIDAR ALIGNMENT USING ROAD POLES

(71) Applicant: GM GLOBAL TECHNOLOGY OPERATIONS LLC, Detroit, MI (US)

(72) Inventors: Yousef Omar, Troy, MI (US); Wende Zhang, Birmingham, MI (US); Hao Yu, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 99 days.

(21) Appl. No.: 17/655,888

(22) Filed: Mar. 22, 2022

(65) Prior Publication Data
US 2023/0306621 A1    Sep. 28, 2023

(51) Int. Cl.
| | |
|---|---|
| *G06T 7/37* | (2017.01) |
| *B60R 1/22* | (2022.01) |
| *G01S 17/87* | (2020.01) |
| *G01S 17/89* | (2020.01) |
| *G06F 18/2321* | (2023.01) |
| *G06F 18/25* | (2023.01) |
| *G06V 20/58* | (2022.01) |

(52) U.S. Cl.
CPC ............ *G06T 7/37* (2017.01); *B60R 1/22* (2022.01); *G01S 17/87* (2013.01); *G01S 17/89* (2013.01); *G06F 18/2321* (2023.01); *G06F 18/251* (2023.01); *G06V 20/58* (2022.01); *G06T 2207/20081* (2013.01); *G06T 2207/30252* (2013.01)

(58) Field of Classification Search
CPC ....... G06F 18/2321; G06V 20/58; B60R 1/22; G06T 7/37
See application file for complete search history.

(56) References Cited

U.S. PATENT DOCUMENTS

| | | | |
|---|---|---|---|
| 2013/0019618 A1* | 1/2013 | Veerasamy | B60S 1/087 62/85 |
| 2021/0109205 A1* | 4/2021 | Liao | G01S 7/481 |

* cited by examiner

*Primary Examiner* — On S Mung
(74) *Attorney, Agent, or Firm* — Lorenz & Kopf, LLP

(57) ABSTRACT

Systems and methods are provided for generating alignment parameters for processing data associated with a vehicle. In one embodiment, a method includes: receiving image data associated with an environment of the vehicle; receiving lidar data associated with the environment of the vehicle; processing, by a processor, the image data to determine data points associated with at least one pole identified within image data; processing, by the processor, the lidar data to determine data points associated with at least one pole identified within the lidar data; selectively storing the data points as data point pairs in a data buffer; iteratively processing, by the processor, the data point pairs with a plurality of perturbations to determine a transformation matrix; generating, by the processor, alignment data based on the transformation matrix; and processing future data based on the alignment parameters.

20 Claims, 3 Drawing Sheets

METHODS AND SYSTEMS FOR CAMERA TO LIDAR ALIGNMENT USING ROAD POLES

TECHNICAL FIELD

The technical field generally relates to computer vision, and more particularly to methods and systems for determining camera to lidar alignment information for use in computer vision in a vehicle.

Modern vehicles are typically equipped with one or more optical cameras that are configured to provide image data that may be displayed to an occupant of the vehicle and that may be used for determining elements of the environment of the vehicle. The image data may show a virtual scene of the vehicle's surroundings. The virtual scene may be generated based on data from one or more cameras and data from one or more other sensors such as lidar or radar. For example, the image data are taken from different image sources that are located at different positions about the vehicle or from a single source that rotates with respect to the vehicle. The image data is evaluated and merged into a single perspective based on alignment information. Methods to determine alignment information can be computationally intensive, especially if performed in real-time.

Accordingly, it is desirable to provide improved systems and methods for determining camera to lidar alignment information. Furthermore, other desirable features and characteristics of the present invention will become apparent from the subsequent detailed description and the appended claims, taken in conjunction with the accompanying drawings and the foregoing technical field and background SUMMARY Systems and methods are provided for generating alignment parameters for processing image data associated with a vehicle. In one embodiment, a method includes: receiving image data associated with an environment of the vehicle; receiving lidar data associated with the environment of the vehicle; processing, by a processor, the image data to determine data points associated with at least one pole identified within image data; processing, by the processor, the lidar data to determine data points associated with at least one pole identified within the lidar data; selectively storing the data points as data point pairs in a data buffer; iteratively processing, by the processor, the data point pairs with a plurality of perturbations to determine a transformation matrix; generating, by the processor, alignment data based on the transformation matrix; and processing future image data based on the alignment parameters.

In various embodiments, the processing the image data includes processing the image data with a cross correlation method between the image data and a two-dimensional filter defining at least one of vertical poles and horizontal poles; and producing a binary output indicating a detection of a road pole based on the processing.

In various embodiments, the two-dimensional filter is learned and normalized.

In various embodiments, the processing the lidar data incudes: removing points from the lidar point cloud points associated with a ground plane, and points associated with a background to produce foreground points; applying a clustering method to the foreground points to determine objects within the scene; and filtering the objects based on geometrical conditions associated with a pole to produce pole objects; and projecting the pole objects into a coordinate system associated with the image data.

In various embodiments, the clustering method is a density-based spatial clustering of applications with noise.

In various embodiments, the geometrical conditions include a width and a height associated with the pole.

In various embodiments, the iteratively processing includes evaluating the data point pairs for each perturbation to produce a transformation matrix; determining a score for each transformation matrix; and selecting a transformation matrix associated with a score that is greater than a threshold, wherein the alignment parameters are determined from the selected transformation matrix.

In various embodiments, the method includes filtering data point pairs based on a proximity to the camera of the at least one road pole from the image data and a proximity to the camera of the at least one road pole from the lidar data.

In various embodiments, the method includes storing a count of a number of iterations and wherein the transformation matrix is selected based on the count being greater than a threshold.

In another embodiment, a computer implemented system for generating alignment parameters for processing data associated with a vehicle is provided. The system includes: a data storage element comprising computer readable instructions; and a processor configured to execute the computer readable instructions, the computer readable instructions controlling the processor to perform operations. The operations include receiving image data associated with an environment of the vehicle; receiving lidar data associated with the environment of the vehicle; processing the image data to determine data points associated with at least one road pole identified within the image data; processing the lidar data to determine data points associated with at least one road pole identified within the lidar data; selectively storing the data points as data point pairs in a data buffer; iteratively processing, by the processor, the data point pairs with a plurality of perturbations to determine a transformation matrix; generating alignment data based on the transformation matrix; and processing future data based on the alignment parameters.

In various embodiments, the processing the image data includes: processing the image data with a cross correlation method between the image data and a two-dimensional filter defining at least one of vertical poles and horizontal poles; and producing a binary output indicating a detection of a road pole based on the processing.

In various embodiments, the two-dimensional filter is learned and normalized.

In various embodiments, the processing the lidar data includes: removing points from the lidar point cloud points associated with a ground plane, and points associated with a background to produce foreground points; applying a clustering method to the foreground points to determine objects within the scene; and filtering the objects based on geometrical conditions associated with a pole to produce pole objects; and projecting the pole objects into a coordinate system associated with the image data.

In various embodiments, the clustering method is a density-based spatial clustering of applications with noise.

In various embodiments, the geometrical conditions include a width and a height associated with the pole.

In various embodiments, the iteratively processing includes: evaluating the data point pairs for each perturbation to produce a transformation matrix; determining a score for each transformation matrix; and selecting a transformation matrix associated with a score that is greater than a threshold, wherein the alignment parameters are determined from the selected transformation matrix.

In various embodiments, the system includes filtering data point pairs based on a proximity to the camera of the at least one road pole from the image data and a proximity to the camera of the at least one road pole from the lidar data.

In various embodiments, the system includes storing a count of a number of iterations and wherein the transformation matrix is selected based on the count being greater than a threshold.

In another embodiment, a vehicle includes: a lidar configured to generate image data associated with an environment of the vehicle; a camera configured to generate lidar data associated with the environment of the vehicle; and a controller configured to, by a processor, receiving the image data and the lidar data, process the image data to determine data points associated with at least one road pole identified within image data, process the lidar data to determine data points associated with at least one road pole identified within the lidar data, selectively store the data points as data point pairs in a data buffer, iteratively process the data point pairs with a plurality of perturbations to determine a transformation matrix, generate alignment data based on the transformation matrix, and process future image data based on the alignment parameters.

In various embodiments, the controller is further configured to process the image data with a cross correlation method between the image data and a learned normalized two-dimensional filter defining at least one of vertical poles and horizontal poles and produce a binary output indicating a detection of a road pole based on the processing.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
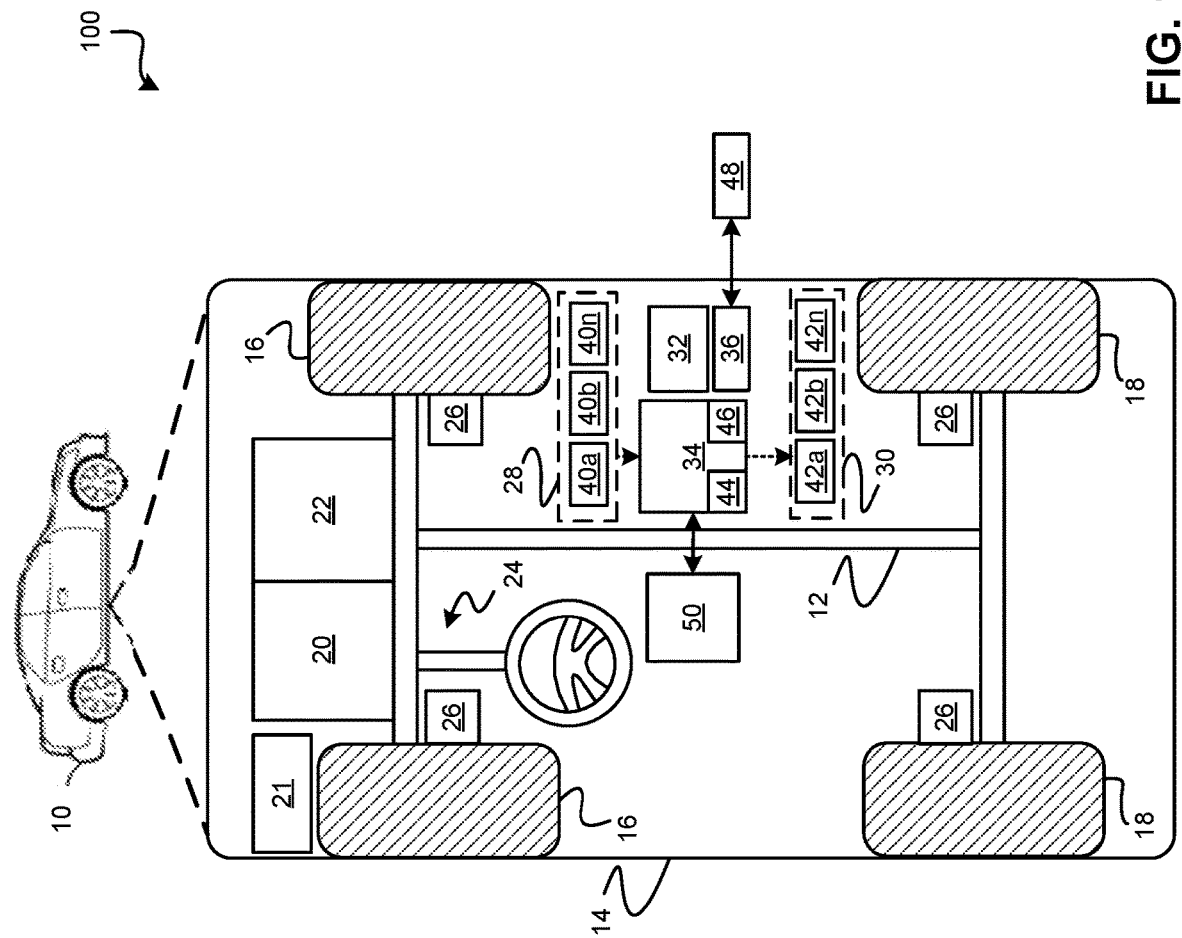
FIG. 1 is a schematic illustration of a vehicle with a controller implementing functions for generating alignment information in accordance with various embodiments.

With reference to FIG. 1, a vehicle 10 is shown having a system 100 in accordance with various embodiments. Generally, the system 100 determines alignment information between different data sources of the vehicle. The alignment information can be used, for example, in processing and/or generating image data from the multiple data sources. The generated image data may be used, for example, to display a surround view of the vehicle's environment on a display 50 of the vehicle 10. As can be appreciated, the alignment data can be used for other purposes such as controlling or navigating the vehicle and is not limited to the display example.

As shown in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16 and 18 are each rotationally coupled to the chassis 12 near a respective corner of the body 14.

In various embodiments, the vehicle 10 is an autonomous vehicle. The autonomous vehicle is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle is an automation system of Level Two or higher. A Level Two automation system indicates "partial automation." However, in other embodiments, the autonomous vehicle may be a so-called Level Three, Level Four or Level Five automation system. A Level Three automation system indicates conditional automation. A Level Four system indicates "high automation," referring to the driving mode-specific performance by an automated driving system of all aspects of the dynamic driving task, even when a human driver does not respond appropriately to a request to intervene. A Level Five system indicates "full automation", referring to the full-time performance by an automated driving system of all aspects of the dynamic driving task under all roadway and environmental conditions that can be managed by a human driver.

However, it is to be understood that the vehicle 10 may also be a conventional vehicle without any autonomous driving functions. The vehicle 10 may implement the functions and methods for generating alignment information in accordance with the present disclosure.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, a fuel cell propulsion system, and/or a combination thereof. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, a manual transmission, or any other appropriate transmission.

The brake system 26 is configured to provide braking torque to the vehicle wheels 16 and 18. The brake system 26 may, in various embodiments, include friction brakes, brake by wire, a regenerative braking system such as an electric machine, and/or other appropriate braking systems. The steering system 24 influences a position of the of the vehicle wheels 16 and 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems (GPS), optical cameras, thermal cameras, ultrasonic sensors, and/or other sensors. The sensing devices 40a-40n are further configured to sense observable conditions of the vehicle 10. The sensing devices 40a-40n can include, but are not limited to, speed sensors, position sensors, inertial measurement sensors, temperature sensors, pressure sensors, etc.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
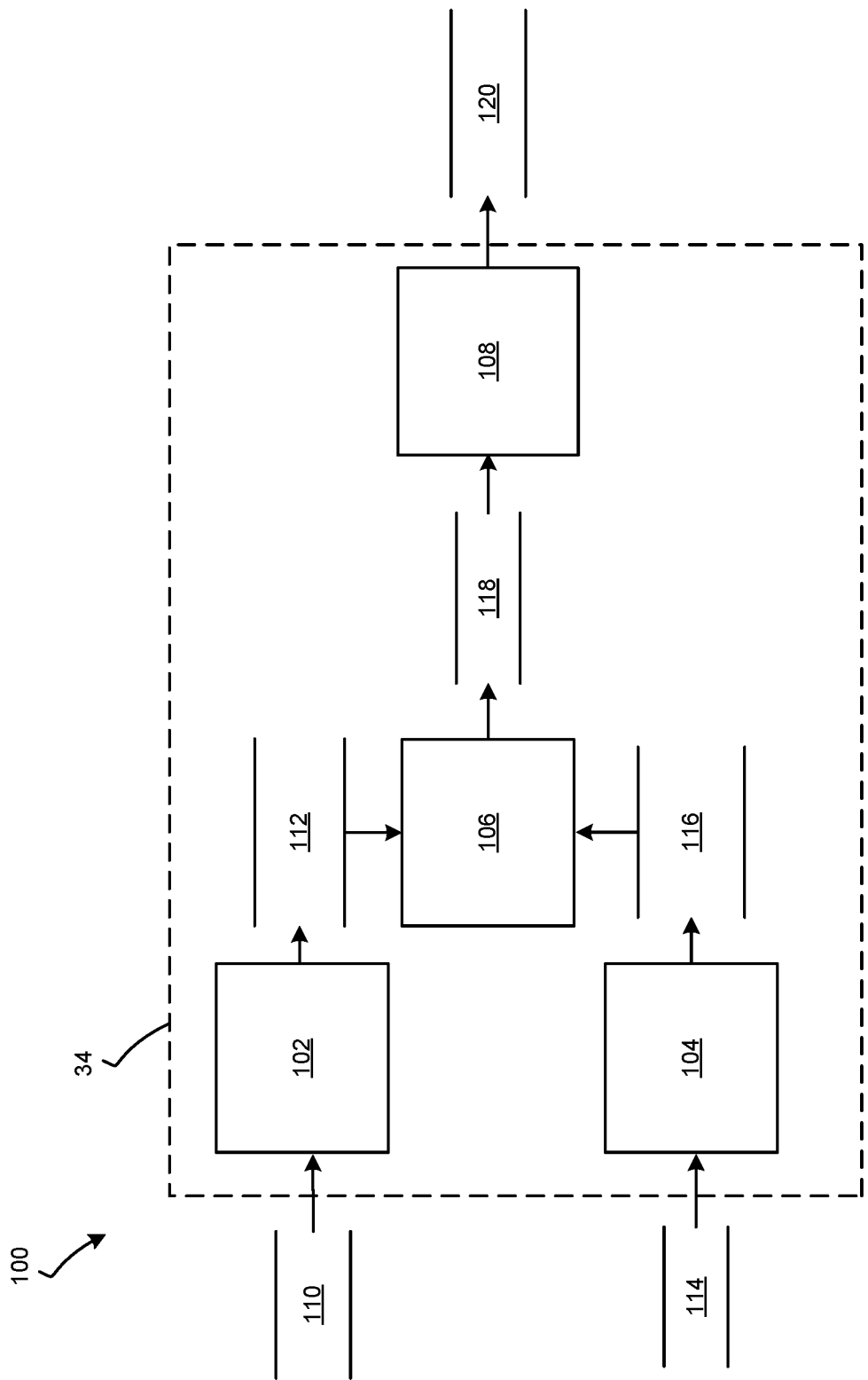
FIG. 2 is dataflow diagram illustrating the controller of the vehicle in accordance with various embodiments.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling functions of the vehicle 10. In various embodiments, the data storage device 32 stores defined maps of the navigable environment. The defined maps may include a variety of data other than road data associated therewith, including elevation, climate, lighting, etc. In various embodiments, the defined maps may be predefined by and obtained from a remote system (described in further detail with regard to FIG. 2). For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling and executing functions of the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the system 100 and, when executed by the processor 44, process image data from at least one optical camera of the sensor system 28 and a point cloud from at least one lidar of the sensor system 28 to detect vertical and/or horizontal road poles in the scene. The instructions, when executed by the processor 44, use pole data to determine camera to lidar alignment information. The camera alignment information is then used to assemble image data for display or for other purposes within the vehicle 10.

It will be appreciated that the controller 34 may otherwise differ from the embodiments depicted in FIG. 1. For example, the controller 34 may be coupled to or may otherwise utilize one or more remote computer systems and/or other control systems, for example as part of one or more of the above-identified vehicle devices and systems. It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 44) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 34 may also otherwise differ from the embodiment depicted in FIG. 1, for example in that the computer system of the controller 34 may be coupled to or may otherwise utilize one or more remote computer systems and/or other control systems.

With reference to FIG. 2, and with continued reference to FIG. 1, a dataflow diagram illustrates elements of the system 100 of FIG. 1 in accordance with various embodiments. As can be appreciated, various embodiments of the system 100 according to the present disclosure may include any number of modules embedded within the controller 34 which may be combined and/or further partitioned to similarly implement systems and methods described herein. Furthermore, inputs to the system 100 may be received from the sensor system 28, received from other control modules (not shown) associated with the vehicle 10, and/or determined/modeled by other sub-modules (not shown) within the controller 34 of FIG. 1. Furthermore, the inputs might also be subjected to preprocessing, such as sub-sampling, noise-reduction, normalization, feature-extraction, missing data reduction, and the like. In various embodiments, the modules of the system 100 include an image data processing module 102, a lidar data processing module 104, a data pair selection module 106, and an alignment determination module 108.

In various embodiments, the image data processing module 102 processes image data 110 to produce pole data 112. The image data 110 includes a two-dimensional image of a scene sensed from the environment and generated by the camera. The lidar data processing module 104 processes lidar data 114 to produce pole data 116. The lidar data 114 includes a three-dimensional point cloud of an environment generated by the lidar.

The data pair selection module 106 processes the pole data 112, 116 to selectively store data pairs in a data buffer 118. The alignment determination module 108 processes the data pairs from the data buffer 118 using an iterative method to determine alignment data 120 that defines alignment information between the camera and the lidar.

Figure 3:
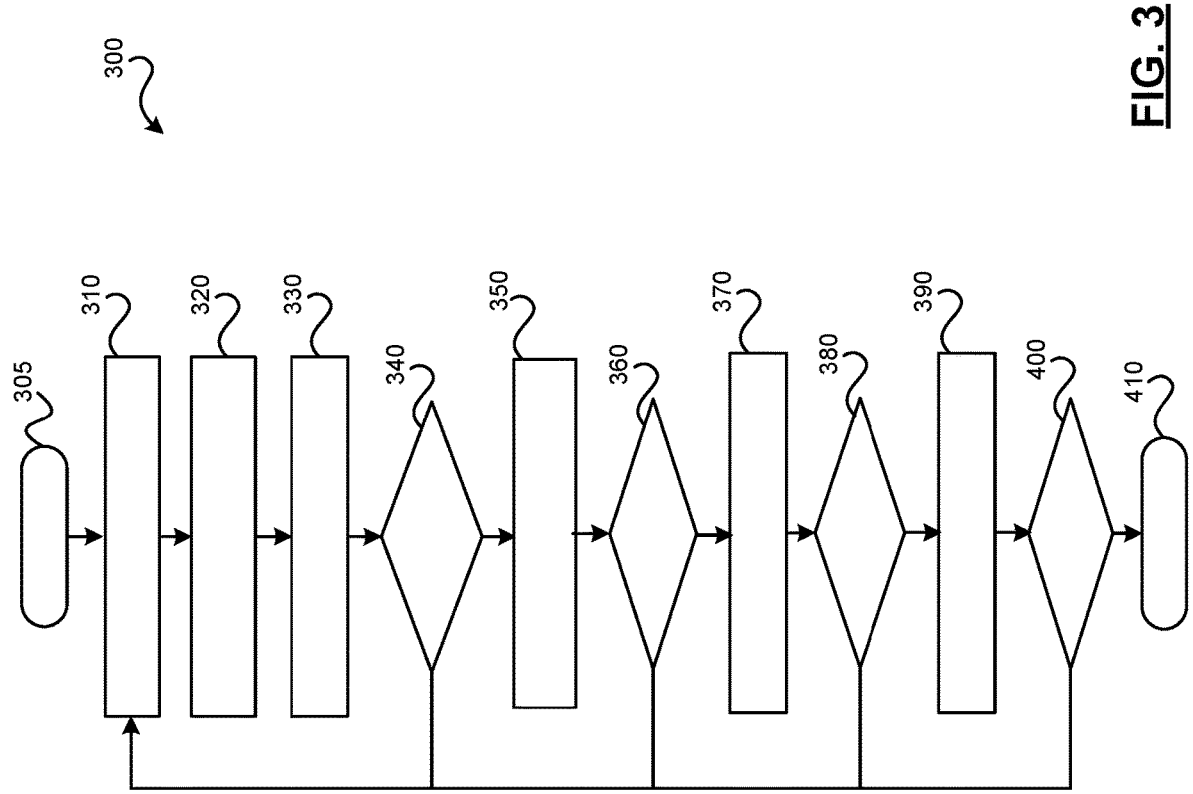
FIG. 3 is a flowchart illustrating a method performed by the vehicle and the controller in accordance with various embodiments.

With reference to FIG. 3 and with continued reference to FIGS. 1-2, flowcharts are provided of a methods 300 for performing lidar to camera alignment as performed by the system 100 of FIGS. 1 and 2. As can be appreciated in light of the disclosure, the order of operation within the methods 300 is not limited to the sequential execution as illustrated in FIG. 3, but may be performed in one or more varying orders as applicable and in accordance with the present disclosure. In various embodiments, the method 300 can be scheduled to run based on one or more predetermined events, and/or can run continuously during operation of the vehicle 10.

In one example, the method 300 may begin at 305. At 310, image data 110 and lidar data 114 are received. At 320, the image data 110 is processed to identify pole data 112. For example, the image data 110 is processed using a normalized two dimensional cross-correlation between defined pole filters and the image to localize horizontal and vertical poles. At 330, the lidar data 114 is processed to determine the pole data 116. For example, the lidar data 114 is processed by first identifying and removing the ground plane and any background points (e.g., points greater than sixty meters from the camera). The remaining foreground points are then processed using a clustering method (e.g., density based spatial clustering of applications with noise (DBScan), or other method) followed by a filtering method (e.g., based filters on geometrical conditions such as height and width associated with poles) to identify the pole points.

Thereafter, at 340, noise clusters are removed through a proximity filter, which evaluates the detected pole points 116 from the lidar data 114 with the pole points 112 estimated from the image data 110. If poles detected from both the image data 110 and the lidar data 114 and are within a specified proximity, an inverse distance transform (IDT) of the pole data 112 result generated from the image data 110 is generated and the processed data pairs of pole data 112, 116 are stacked in the data buffer 118 at 350.

Once the data buffer 118 is full (e.g., ten data pairs) at 360, alignment is performed at 370. For example, an iterative alignment method searches through a group of perturbations in order to find an optimal transformation matrix. In various embodiments, a score is then computed from the optimal transformation matrix and compared to a threshold score. The method 300 continues until a threshold score is reached at 380.

For, every iteration of the method 300 that produces a threshold score at 380, the alignment method 300 increments a stop counter at 390. Once the stop counter reaches a threshold (e.g., 100 counts) at 400, the alignment data 120 is made available from the final transformation matrix and the method may end at 410.

As can be appreciated, the computational resources needed for aligning a camera with a lidar is thus improved by the methods and systems described herein, and accordingly, the claimed embodiments effectuate an improvement in the technical field of computer vision.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for generating alignment parameters for processing data associated with a vehicle, the method comprising:

receiving image data associated with an environment of the vehicle;

receiving lidar data associated with the environment of the vehicle;

processing, by a processor, the image data to determine data points associated with at least one road pole identified within image data;

processing, by the processor, the lidar data to determine data points associated with at least one road pole identified within the lidar data;

selectively storing the data points as a set of data point pairs in a data buffer;

iteratively processing, by the processor, the set of data point pairs with a plurality of perturbations to determine a plurality of transformation matrices, wherein the iteratively processing results in each of the plurality of transformation matrices having an associated score;

selecting, by the processor, an optimal transformation matrix with a threshold associated score from the plurality of transformation matrices;

generating, by the processor, alignment data based on the optimal transformation matrix; and processing the data associated with the vehicle based on the alignment parameters.

2. The method of claim 1, wherein the processing the image data comprises:

processing the image data with a cross correlation method between the image data and a two-dimensional filter defining at least one of vertical poles and horizontal poles; and producing a binary output indicating a detection of a road pole based on the processing.

3. The method of claim 2, wherein the two-dimensional filter is learned and normalized.

4. The method of claim 1, wherein the processing the lidar data comprises:

removing points from the lidar point cloud points associated with a ground plane, and points associated with a background to produce foreground points;

applying a clustering method to the foreground points to determine objects within the scene; and filtering the objects based on geometrical conditions associated with a pole to produce pole objects; and projecting the pole objects into a coordinate system associated with the image data.

5. The method of claim 4, wherein the clustering method is a density-based spatial clustering of applications with noise.

6. The method of claim 4, wherein the geometrical conditions include a width and a height associated with the pole.

7. The method of claim 1, wherein the iteratively processing comprises determining the associated score for each transformation matrix.

8. The method of claim 1, further comprising filtering data point pairs based on a proximity to the camera of the at least one road pole from the image data and a proximity to the camera of the at least one road pole from the lidar data.

9. The method of claim 1, further comprising storing a count of a number of the iterations and the selecting of the transformation matrix with the threshold associated score and wherein the selected transformation matrix is selected based on the count being greater than a threshold.

10. A computer implemented system for generating alignment parameters for processing data associated with a vehicle, the system comprising:

a data storage element comprising computer readable instructions; and a processor configured to execute the computer readable instructions, the computer readable instructions controlling the processor to perform operations comprising:

receiving image data associated with an environment of the vehicle;

receiving lidar data associated with the environment of the vehicle;

processing the image data to determine data points associated with at least one road pole identified within the image data;

processing the lidar data to determine data points associated with at least one road pole identified within the lidar data;

selectively storing the data points as a set of data point pairs in a data buffer;

iteratively processing, by the processor, the set of the data point pairs with a plurality of transformation matrices, wherein the iteratively processing results in each of the plurality of transformation matrices having an associated score;

selecting, by the processor, an optimal transformation matrix with a threshold associated score from the plurality of transformation matrices;

generating alignment data based on the optimal transformation matrix; and processing the data associated with the vehicle based on the alignment parameters.

11. The system of claim 10, wherein the processing the image data comprises:

processing the image data with a cross correlation method between the image data and a two-dimensional filter defining at least one of vertical poles and horizontal poles; and producing a binary output indicating a detection of a road pole based on the processing.

12. The system of claim 11, wherein the two-dimensional filter is learned and normalized.

13. The system of claim 10, wherein the processing the lidar data comprises:

removing points from the lidar point cloud points associated with a ground plane, and points associated with a background to produce foreground points;

applying a clustering method to the foreground points to determine objects within the scene; and filtering the objects based on geometrical conditions associated with a pole to produce pole objects; and projecting the pole objects into a coordinate system associated with the image data.

14. The system of claim 13, wherein the clustering method is a density-based spatial clustering of applications with noise.

15. The system of claim 13, wherein the geometrical conditions include a width and a height associated with the pole.

16. The system of claim 10, wherein the iteratively processing comprises determining the score for each transformation matrix; and selecting the transformation matrix associated with a score that is greater than a threshold, wherein the alignment parameters are determined from the selected transformation matrix.

17. The system of claim 10, further comprising filtering data point pairs based on a proximity to the camera of the at least one road pole from the image data and a proximity to the camera of the at least one road pole from the lidar data.

18. The system of claim 10, further comprising storing a count of a number of the iterations and the selecting of the optimal transformation matrix with the threshold associated score and wherein the transformation matrix is selected based on the count being greater than a threshold.

19. A vehicle, comprising:
  a lidar configured to generate image data associated with an environment of the vehicle;
  a camera configured to generate lidar data associated with the environment of the vehicle; and
  a controller configured to, by a processor, receiving the image data and the lidar data, process the image data to determine data points associated with at least one road pole identified within image data, process the lidar data to determine data points associated with at least one road pole identified within the lidar data, selectively store the data points as a set of data point pairs in a data buffer, iteratively process the set of data point pairs with a plurality of transformation matrices, wherein the iteratively processing results in each of the plurality of transformation matrices having an associated score, select a transformation matrix with a threshold associated score from the plurality of transformation matrices, generate alignment data based on the optimal transformation matrix, and process future image data based on the alignment parameters.

20. The vehicle of claim 19, wherein the controller is further configured to process the image data with a cross correlation method between the image data and a learned normalized two-dimensional filter defining at least one of vertical poles and horizontal poles and produce a binary output indicating a detection of a road pole based on the processing.

* * * * *